(12) United States Patent
Paschkowski et al.

(10) Patent No.: US 8,865,822 B2
(45) Date of Patent: Oct. 21, 2014

(54) HOT MELT ADHESIVE COMPOSITIONS HAVING GOOD ADHESION ON BOTH POLAR AND NONPOLAR SUBSTRATES

(75) Inventors: Kai Paschkowski, Jork (DE); Doreen Janke, Alveslohe (DE)

(73) Assignee: SIKA Technology AG, Baar (CH)

( * ) Notice: Subject to any disclaimer, the term of this patent is extended or adjusted under 35 U.S.C. 154(b) by 68 days.

(21) Appl. No.: 13/526,157

(22) Filed: Jun. 18, 2012

(65) Prior Publication Data

US 2012/0315491 A1 Dec. 13, 2012

Related U.S. Application Data

(63) Continuation of application No. PCT/EP2010/069816, filed on Dec. 15, 2010.

(30) Foreign Application Priority Data

Dec. 18, 2009 (EP) .................................... 09179940

(51) Int. Cl.
| | |
|---|---|
| C09J 183/10 | (2006.01) |
| B32B 7/12 | (2006.01) |
| B32B 27/06 | (2006.01) |
| B32B 37/12 | (2006.01) |
| C09J 123/08 | (2006.01) |
| B32B 27/32 | (2006.01) |
| C08G 18/28 | (2006.01) |
| C08J 5/12 | (2006.01) |
| C09J 151/06 | (2006.01) |
| C08G 18/80 | (2006.01) |

(52) U.S. Cl.
CPC .......... *C09J 151/06* (2013.01); *C09J 123/0815* (2013.01); *B32B 27/32* (2013.01); *C08G 18/289* (2013.01); *C08J 5/121* (2013.01); *B32B 7/12* (2013.01); *C08G 18/809* (2013.01); *C08J 2323/00* (2013.01)
USPC ..... 524/502; 524/547; 428/424.2; 428/423.1; 156/329; 525/123

(58) Field of Classification Search
USPC ............ 524/502, 547; 428/480, 424.2, 423.1; 525/123; 156/329
See application file for complete search history.

(56) References Cited

U.S. PATENT DOCUMENTS

| | | | |
|---|---|---|---|
| 5,241,014 A | 8/1993 | Kehr et al. | |
| 5,994,474 A * | 11/1999 | Wey et al. | ...................... 525/288 |
| 5,994,747 A | 11/1999 | Wu | |
| 2007/0055038 A1* | 3/2007 | Gimmnich et al. | ............. 528/49 |
| 2008/0071043 A1* | 3/2008 | Ram et al. | ...................... 525/477 |
| 2009/0142610 A1* | 6/2009 | Paschkowski et al. | ........ 428/480 |
| 2011/0020634 A1 | 1/2011 | Paschkowski et al. | |

FOREIGN PATENT DOCUMENTS

| | | |
|---|---|---|
| DE | 40 00 695 A1 | 7/1991 |
| EP | 0 827 994 A2 | 3/1998 |
| EP | 2 113 545 A1 | 11/2009 |

OTHER PUBLICATIONS

International Preliminary Report on Patentability (PCT IB373) issued on Jul. 4, 2012, and the English language translation of the Written Opinion (PCT/ISA/237) for International Application No. PCT/EP2010/069816.
International Search Report (PCT/ISA/210) issued on Feb. 25, 2011, by the European Patent Office as the International Searching Authority for International Application No. PCT/EP2010/069816.
Written Opinion (PCT/ISA/237) issued on Feb. 25, 2011, by the European Patent Office as the International Searching Authority for International Application No. PCT/EP2010/069816.

* cited by examiner

*Primary Examiner* — James J Seidleck
*Assistant Examiner* — Deve E Valdez
(74) *Attorney, Agent, or Firm* — Buchanan Ingersoll & Rooney PC (57) ABSTRACT

A hot melt adhesive composition including a) at least one thermoplastic silane grafted poly-α-olefin that is solid at 25° C.; and b) at least one reaction product of a polyisocyanate having an isocyanate-reactive silane, wherein the isocyanate-reactive silane includes exactly one group reactive to an isocyanate group, selected from a hydroxyl group, a mercapto group, and an amino group, and wherein the reaction product includes a molecular weight $M_w$ of less than 1500 g/mol.

22 Claims, 1 Drawing Sheet

US 8,865,822 B2

HOT MELT ADHESIVE COMPOSITIONS HAVING GOOD ADHESION ON BOTH POLAR AND NONPOLAR SUBSTRATES

RELATED APPLICATION(S)

This application claims priority as a continuation application under 35 U.S.C. §120 to PCT/EP2010/069816, which was filed as an International Application on Dec. 15, 2010 designating the U.S., and which claims priority to European Application No. 09179940.3 filed in Europe on Dec. 18, 2009. The entire contents of these applications are hereby incorporated by reference in their entireties.

FIELD

Disclosed are hot melt adhesives, for example, for the adhesion of polar and nonpolar substrates.

BACKGROUND INFORMATION

A hot melt adhesive can be melted and the melted adhesive can be applied in a thin layer. Such an adhesive can exhibit a limited pot life. For example, the thin layer of adhesive can cool down very fast and solidify in such a manner that the top surface of the part to be joined is no longer tacky and no longer creates an adhesive bond. This can be the case when dealing with hot melt adhesives that are based upon amorphous thermoplastics. In addition, the adhesive can remain thermoplastic after application. This can lead to renewed melting of the adhesive in the adhesive bond upon heating of the adhesive bond which can lead to a corruption of the bond under load.

Polyurethane hot melt adhesives are reactive hot melt adhesives. They can react with moisture and cure following the application. Bonds that are thermally stable can be achieved. These adhesives can be weak immediately after their application. Such adhesives can build up their strength over time, for example, when they cure. For example, reactive polyurethane hot melt adhesives can feature a longer pot life in thin layers but can have a limited initial strength.

Hot melt adhesives which are based upon silane grafted poly-α-olefins are disclosed in, for example, U.S. Pat. No. 5,994,474 and DE 40 00 695 A1. These adhesives are hot melt adhesives and reactive hot melt adhesives, which can allow the achievement of high strength and thermal stability. At the same time, the initial strength can be very high. In thin coats these adhesives can feature a very short pot life, which can be detrimental to its use as a laminating adhesive without a prior reactivation (re-melting).

These adhesives can exhibit good adhesion to non-polar surfaces such as polypropylene or polyethylene. However the adhesion to polar substrates can be very limited.

EP 2 113 545 A1 describes a reactive hot melt adhesive which can demonstrate a long pot life and a good adhesion to non-polar substrates but limited adhesion to polar substrates.

SUMMARY

According to an exemplary aspect, disclosed is a hot melt adhesive composition, comprising: a) at least one thermoplastic silane grafted poly-α-olefin (P) that is solid at 25° C.; and b) at least one reaction product (RP) of a polyisocyanate with an isocyanate reactive silane (S); wherein the isocyanate reactive silane (S) contains only one isocyanate reactive group, wherein the isocyanate reactive group is selected from the group consisting of a hydroxyl group, mercapto group and amino group, and wherein the reaction product has a molecular weight $M_w$ of less than 1,500 g/mol.

According to another exemplary aspect, disclosed is a method of using a hot melt adhesive composition, the method comprising applying the hot melt adhesive composition according to claim 1 to a first substrate.

According to another exemplary aspect, disclosed is a composite element, comprising: a) a first substrate (S1); b) the hot melt adhesive composition according to claim 1, or the hot melt adhesive composition according to claim 1 that is cured through the influence of water; and c) a second substrate (S2); wherein the hot melt adhesive composition or the cured hot melt adhesive composition is located between the first substrate (S1) and the second substrate (S2).

DETAILED DESCRIPTION

According to an exemplary aspect, disclosed is a hot melt adhesive that adheres well to both polar and non-polar substrates, which also demonstrates an increased pot life in thin layers, but which nonetheless quickly builds up a major early strength.

In an exemplary aspect, a hot melt adhesive composition is disclosed which comprises:

a) at least one thermoplastic silane grafted poly-α-olefin (P) that is solid at 25° C.;

b) at least one reaction product (RP) from the reaction of a polyisocyanate with an isocyanate-reactive silane (S), wherein the isocyanate reactive silane (S) contains one isocyanate reactive group, for example only one isocyanate reactive group, which is selected from hydroxyl groups, mercapto groups and amino groups, and wherein the reaction product has a molecular weight $M_w$ of less that 1,500 g/mol.

In this document, an "α-olefin" includes an alkene having the molecular formula $C_xH_{2x}$ (x corresponds to the number of carbon atoms), which features a double C—C bond at the first carbon atom (α-Carbon). Examples of α-olefins are ethylene, propylene, 1-butene, 2-methyl-1-propene (=isobutylene), 1-pentene, 1-hexene, 1-heptene and 1-octene. For example, neither 1,3-butadiene, nor 2-butene, nor styrene represent α-olefins.

In this document, "poly-α-olefins" include homopolymers made of α-olefins and copolymers made of multiple distinct α-olefins. They can have an amorphous structure.

In this document, substance names that begin with "poly", such as polyol, polyisocyanate or similar, indicate substances that contain two or more of the functional groups that appear in their name in each molecule.

In this document, the term "polyisocyanate" encompasses compounds with two or more isocyanate groups.

In this document, the term "silane" includes a compound containing silicon, in which the silicon atom carries at least one, for example, two or three alkoxy groups. The compound can have at least one directly bonded organic remainder and thereby can have at least one Si—C bond. The term "silane group" includes the silane containing group that is bonded to the organic remainder of the silane. Silane, or its silane groups, can have the property of hydrolyzing upon contact with moisture and thereby releasing an alcohol. For example, siloxane or silicones are not to be considered as silanes in the sense of this disclosure.

The indications P, RP, S, P', S1, S2, K, K' or similar are solely to facilitate identification and better legibility.

In an exemplary embodiment, the hot melt adhesive composition contains a thermoplastic silane grafted poly-α-olefin (P), which is solid at 25° C.

For example, the silane grafted poly-α-olefin (P) can have a softening temperature of between 60° C. and 160° C., for example, between 80° C. and 140° C., for example, between 90° C. and 120° C.

The ring and ball softening point can be measured according to DIN EN 1238.

Through the grafting of unsaturated silane, such as vinyl trimethoxysilane they can allow themselves to be included on a poly-α-olefin. A detailed description of the production of such silane grafted poly-α-olefins is for example disclosed in U.S. Pat. No. 5,994,747 and DE 40 00 695 A1, the contents of which are herein incorporated by reference.

For example, the silane grafted poly-α-olefin (P) can be a silane grafted copolymer or terpolymer made up of at least one of the monomers, which are chosen from ethylene, propylene, butylene and isobutylene. An example is the silane grafted poly-α-olefin (P) of a silane grafted polyethylene or polypropylene.

The silane grafted poly-α-olefin (P) can be a silane grafted atactic poly-α-olefin (APAO).

In an exemplary embodiment, the poly-α-olefin (P) can be produced through the grafting of silanes on a poly-α-olefin, which in turn was produced according to the Ziegler-Natta process.

The silane grafted poly-α-olefins (P) can be a silane grafted poly-α-olefin, which is a poly-α-olefin which is produced by means of metallocene catalysts, upon which silane groups are grafted. For example, these can be silane grafted polypropylene homopolymers or polyethylene homopolymers.

The degree of grafting of the silane grafted poly-α-olefin (P) can be greater than 1% by weight, for example, greater than 3% by weight of silane in relation to the weight of the poly-α-olefins. For example, this degree of grafting lies between 2 and 15% by weight, for example, between 4 and 15% by weight, for example, between 8 and 12% by weight. The degree of grafting can be between 8 and 12% by weight when poly-α-olefins which are produced over metallocene catalysts are used for the silane grafted poly-α-olefins.

The hot melt adhesive composition can have at least two different silane grafted poly-α-olefins (P).

The hot melt adhesive composition can have at least one poly-α-olefin (P), which is produced through the grafting of silanes on a poly-α-olefin, which in turn is produced according to the Ziegler-Natta process, as well as at least one silane grafted poly-α-olefin (P), which is a poly-α-olefin that is produced by means of metallocene catalysts, upon which the silane groups are grafted.

The proportion of all the silane grafted poly-α-olefins (P) can amount to more than 40% by weight, for example, 50 to 80% by weight.

The hot melt adhesive composition can contain a poly-α-olefin (P') that is a solid thermoplastic at room temperature, for example, an atactic poly-α-olefin (APAO).

For example, the solid thermoplastic atactic poly-α-olefins (P') can have a softening point that is greater than 90° C., for example, between 90° C. and 130° C. The molecular weight can amount to between 7,000 and 25,000 g/mol. Metallocene catalysts can be used for the production of the atactic poly-α-olefins (P').

A weight ratio of the solid silane grafted poly-α-olefin (P) to the solid thermoplastic poly-α-olefin (P') can be the range of 1:1 to 20:1. A proportion of solid thermoplastic poly-α-olefin (P') drawn on the hot melt composition of between 5 and 40% by weight can be employed.

The hot melt adhesive composition can contain at least one reaction product (RP) of a polyisocyanate with an isocyanate reactive silane (S). The isocyanate reactive silane (S) includes one isocyanate reactive group, for example, precisely only one isocyanate reactive group, which is selected from hydroxyl groups, mercapto groups and amino groups. The reaction product can have a molecular weight $M_w$ of less than 1,500 g/mol.

Isocyanate reactive silanes which feature multiple isocyanate reactive groups, such as for example N-(2-aminoethyl)-3-aminopropyl-trimethoxysilane can be, for example, not suitable and not used. For example, if such silanes are used, the polyisocyanates can react multiple times and lead to highly cured products.

Reaction products (RP), for example, those reaction products with high molecular weights (for example, molecular weights $M_w>1500$ g/mol) between polyisocyanate and isocyanate reactive silane, can be, for example, not suitable and not used. Silane terminated polyurethane prepolymers (abbreviated as S-PUR), which can be employed in polyurethane proof materials that cure at room temperature, can be, for example, not suitable and not used. For example, if such reaction products with high molecular weights are used on their own, for example, without being combined with exemplary reaction products, the corresponding hot melt adhesive compositions can have either no or at best insufficient adhesion on polar substrates.

In an exemplary embodiment, the reaction product (RP) does not or only minimally increases the viscosity of the hot melt adhesive composition. For example, the reaction product (RP) can have a low viscosity, for example, less than 1 Pa·s at 40° C.

The reaction product (RP) can be employed in a quantity of 3-50% by weight, for example, of 4-20% by weight, for example, of 4-10% by weight, with respect to the total hot melt adhesive composition.

In an exemplary embodiment, the pot life is only minimally shortened through the addition of the reaction product (RP).

For example, the bond in the formula (I) of the isocyanate reactive silane (S) is suitable for the creation of the reaction product (RP).

(I)

Herein $R^1$ stands for a linear or branched, for example, cyclical, alkylene groups with between 1 and 20 C atoms, for example, with aromatic portions. Furthermore $R^2$ stands for an alkyl group with between 1 and 5 C atoms, for example, for a methyl- or ethyl group, or an acyl group. $R^3$ stands for an alkyl group with between 1 and 8 C atoms, for example, for a methyl group. Furthermore "a" stands for one of the values 0, 1 or 2, for example, 0 or 1. For example, "a" is 0. "X" stands for an isocyanate reactive group, for example, selected from —OH, —SH, —NH$_2$ and —NHR$^4$.

$R^4$ herein can stand either for an alkyl remainder with between 1 and 12 C atoms or for a cycloaliphatic remainder with between 6 and 12 C atoms. R⁴ can stand for one of the substituents of the formula (II).

The dotted lines in the formulae in this document represent in each case the bond between one substituent and the corresponding molecule remainder.

Exemplary isocyanate-reactive silanes (S) are:
3-aminopropyltrimethoxysilane, 3-aminopropyltriethoxysilane, 3-amino-propyl-dimethoxymethylsilane, 3-amino-2-methylpropyl-trimethoxysilane, 4-aminobutyl-trimethoxysilane, 4-aminobutyl-dimethoxymethylsilane, 4-amino-3-methylbutyl-trimethoxysilane, 4-amino-3,3-dimethylbutyl-trimethoxysilane, 4-amino-3,3-dimethylbutyl-dimethoxymethylsilane, 2-aminoethyl-trimethoxysilane, 2-aminoethyl-dimethoxymethylsilane, aminomethyl-trimethoxysilane, aminomethyl-dimethoxymethylsilane, aminomethylmethoxydimethylsilane, 7-amino-4-oxaheptyldimethoxymethylsilane, N-(methyl)-3-aminopropyltrimethoxysilane, N-(n-butyl)-3-aminopropyltrimethoxysilane bis-[3-(trimethoxysilyl)-propyl]-amine, bis[3-(triethoxysilyl)-propyl]-amine; 3-mercaptopropyltriethoxysilane, 3-mercaptopropyltrimethoxysilane, 3-mercapto-propyltriisopropoxysilane, 3-mercaptopropyldiethoxymethylsilane, 3-mercapto-propyldimethoxymethylsilane, 3-mercaptopropyldiisopropoxmethylsilane, 3-mer-captomethyltrimethoxysilane, 3-mercaptomethyltriethoxysilane, 3-mercaptomethyltriisopropoxysilane, mercaptomethyldimethoxymethylsilane, mercapto-methyldiethoxymethylsilane, 3-mercaptopropyl-methyldimethoxysilane, 3-mercaptopropyl-methoxy(1,2-ethylendioxy)-silane, 3-mercaptopropyl-methoxy(1,2-propylendioxy)-silane, 3-mercaptopropyl-ethoxy(1,2-propylendioxy)-silane, 3-mercaptopropyl-dimethoxymethylsilane, 3-mercaptopropyl-diethoxymethylsilane, 3-mercapto-2-methylpropyl-trimethoxysilane and 4-mercapto-3,3-dimethylbutyl-trimethoxysilane.

Exemplary isocyanate reactive silanes (S) are 3-mercaptopropyltriethoxysilane and 3-mercaptopropyltrimethoxysilane, for example, 3-mercapto-propyltrimethoxysilane.

The polyisocyanates employed for the production of the reaction product (RP) can be 2,4- and 2,6-toluoylendiisocyanate (TDI) and any desired mixtures of these isomers, 4,4'-, 2,4'- and 2,2'-diphenylmethandiisocyanate and any desired mixtures of these isomers (MDI), mixtures made up of MDI and MDI-Homologues (polymeric MDI or PMDI), 1,3- and 1,4-phenylendiisocyanate, naphthaline-1,5-diisocyanate (NDI), 3,3'-dimethyl-4,4'-diisocyanatodiphenyl (TODI), 1,6-hexamethylendiisocyanate (HDI), 2-methylpentamethylene-1,5-diisocyanate, 2,2,4- and 2,4,4-trimethyl-1,6-hexamethylendiisocyanate (TMDI), 1,12-dodecamethylendiisocyanate, cyclohexane-1,3- and cyclohexane-1,4-diisocyanate and any desired mixtures of these isomers, 1-isocyanato-3,3,5-trimethyl-5-isocyanatomethyl-cyclohexane (=isophorone diisocyanate or IPDI), perhydro-2,4'- and -4,4'-diphenylmethane diisocyanate (HMDI), 1,4-diisocyanato-2,2,6-trimethylcyclohexane (TMCDI), m- and p-xylylendiisocyanate (m- and p-XDI), m-tetramethyl-1,3- and m-tetramethyl-1,4-xylylene diisocyanate and p-tetramethyl-1,3- and m-tetramethyl-1,4-xylylene diisocyanate (m- and p-TMXDI).

Further exemplary polyisocyanates are the isocyanurates and biurets of the immediately aforementioned polyisocyanates.

For example, polyisocyanates which are selected amongst the group made up of 4,4'-, 2,4'- and 2,2'-diphenylmethane diisocyanate (MDI), 2,4- and 2,6-toluoylene diisocyanate (TDI), 1,6-hexamethylene diisocyanate (HDI), 1-isocyanato-3,3,5-trimethyl-5-isocyanatomethyl-cyclohexane (=isophorone diisocyanate or IPDI); isocyanurates of MDI, TDI, HDI or IPDI, as well as biurets of MDI, TDI, HDI and/or IPDI can be used for the polyisocyanate that is employed for the production of the reaction product (RP).

For the creation of the reaction product (RP) at least one isocyanate reactive silane (S) and at least one polyisocyanate can react with one another in a suitable manner. For example, if the reaction takes place in the presence of a stoichiometric surplus of the isocyanate groups when compared with the isocyanate groups reactive group of the isocyanate reactive silane (S), then not all the isocyanate groups will be abreacted, for example, the reaction product (RP) features both isocyanate groups and silane groups. In an exemplary case, in which the polyisocyanate is a diisocyanate and the isocyanate reactive silane carries a silane group, the reaction product (RP) that is created can carry precisely one silane group and one isocyanate group.

The reaction can take place on a stoichiometric basis, for example, in a stoichiometric shortage, of the isocyanate groups when compared with the isocyanate groups reactive group of the isocyanate reactive silane (S). This can ensure that all isocyanate groups are substantially reacted.

In an exemplary embodiment, the reaction product (RP) of a polyisocyanate with an isocyanate reactive silane does not feature any isocyanate groups.

The reaction products of 4,4'-, 2,4'- or 2,2'-diphenylmethane diisocyanate (MDI) with a 3-mercaptopropyltrimethoxysilane, 3-mercaptopropyltriethoxysilane or 3-mercaptopropyl-dimethoxymethylsilane are exemplary reaction products (RP).

A reaction product of 4,4'-, 2,4'- or 2,2'-diphenylmethane diisocyanate (MDI) with a 3-mercaptopropyltrimethoxysilane, 3-mercaptopropyltriethoxysilane or 3-mercaptopropyl-dimethoxymethylsilane, produced in a stoichiometric surplus of the isocyanate reactive groups of the isocyanate reactive silane (S) when compared to the isocyanate groups of the polyisocyanate is an exemplary reaction product (RP).

The hot melt adhesive composition can also include at least one adhesion promoter of the formula (III).

Herein $R^{1'}$ stands for a linear or branched, for example, cyclical alkylene group with between 1 and 20 C atoms, for example, with aromatic portions and/or heteroatoms, for example, in the form of amine nitrogen atoms. $R^{2'}$ stands for an alkyl group having between 1 and 5 C atoms, for example, for a methyl or ethyl group, or an acyl group and $R^{3'}$ stands for an alkyl group having between 1 and 8 C atoms, for example, for a methyl group. "b" stands for one of the values 0, 1 or 2, for example, 0 or 1. For example, "b" can stand for 0. X' stands for a group which is selected from —OH, —SH, —NH₂, —NHR⁴', glycidyloxy-, (meth)acryloxy-, acylthio- and vinyl groups.

$R^{4'}$ can stand either for an alkyl remainder with between 1 and 12 C atoms or for a cycloaliphatic or aromatic remainder having between 6 and 12 C atoms. $R^{4'}$ can stand for a substituent of the formula (IV).

$$\text{----}R^{1'}\text{---}\underset{|}{\overset{R^{3'}_{a}}{Si}}\text{---}(OR^{2'})_{3-b}. \tag{IV}$$

The adhesion promoter of the formula (III) can stand, for example, for an adhesion promoter which is selected from: 3-glycidyloxypropyltrimethoxysilane, 3-glycidyloxypropyltriethoxysilane; 3-ethacryloxypropyltrialkoxysilane, 3-methacryloxypropyltriethoxysilane, 3-methacryloxypropyltrimethoxysilane; 3-aminopropyltrimethoxysilane, 3-aminopropyltriethoxysilane, 3-aminopropyl-dimethoxymethylsilane, 3-amino-2-methylpropyl-trimethoxysilane, N-(2-aminoethyl)-3-aminopropyl-trimethoxysilane, N-(2-aminoethyl)-3-aminopropyl-triethoxysilane, N-(2-aminoethyl)-3-aminopropyl-dimethoxymethylsilane, 4-aminobutyl-trimethoxysilane, 4-aminobutyl-dimethoxy-methylsilane, 4-amino-3-methylbutyl-trimethoxysilane, 4-amino-3,3-dimethylbutyl-trimethoxysilane, 4-amino-3,3-dimethylbutyl-dimethoxymethylsilane, 2-aminoethyl-trimethoxysilane, 2-aminoethyl-dimethoxymethylsilane, aminomethyl-trimethoxysilane, aminomethyl-dimethoxymethylsilane, aminomethylmethoxydimethylsilane, 7-amino-4-oxaheptyldimethoxymethylsilane, N-(methyl)-3-aminopropyltrimethoxysilane, N-(n-butyl)-3-aminopropyltrimethoxysilane, bis-[3-(trimethoxysilyl)-propyl]-amine, bis-[3-(triethoxy-silyl)-propyl]-amine, 3-mercaptopropyltriethoxysilane, 3-mercaptopropyltrimethoxysilane, 3-mercaptopropyl-methyldimethoxysilane; 3-acylthiopropyltrimethoxysilane; vinyltrimethoxysilane and vinyltriethoxysilane.

In the case in which the adhesion promoter of the formula (III) is an isocyanate reactive silane (S) of the formula (I), then this adhesion promoter can either be subsequently added to the hot melt adhesive composition, or it can already be added during the production of the reaction product (RP). In the event in which a stoichiometric surplus of the one isocyanate reactive silane (S) of the formula (I) is used during the production of the reaction product, the remaining isocyanate reactive silane (S) can remain in the reaction mixture of the reaction product (RP) and can be used without separation of the reaction product (RP) that is formed for the hot melt adhesive composition.

For example, the amount of all the adhesion promoters in the formula (III) lies under 10% by weight, for example, between 0.1 and 8% by weight, for example, between 0.2 and 6% by weight, with respect to the weight of the hot melt adhesive composition.

The hot melt adhesive composition can contain at least one resin (H) having a melting point or softening point between −10° C. and 95° C. The resin (H) can be very near to the melting or softening point at room temperature (23° C.), and it can be already either fluid or very soft at room temperature. The resins can be either natural resins or synthetic resins.

For example, such resins (H) are medium or high molecular compounds from the classes of the paraffin-, hydrocarbon resins, polyolefins, polyester, polyether, poly(meth)acrylate or amino resins.

The resin (H) can include a melting or softening point of between 0° C. and 95° C., for example, between 10° C. and 25° C.

The resin (H) is a hydrocarbon resin in an exemplary embodiment, for example, an aliphatic $C_5$-$C_9$ hydrocarbon resin or an aromatic modified $C_5$-$C_9$ hydrocarbon resin.

An aliphatic $C_5$ hydrocarbon resin can be suitable as resin (H), which is commercialized under the trade name Wingtack® 10 or Wingtack® 86 by the company Cray Valley.

Exemplary resins are, for example, polyterpene resins, such as is commercialized under the name Sylvares® TR A25 by Arizona Chemical, USA, rosin ester and tall resin ester, as are, for example, commercialized under the names Sylvatac® RE 12, Sylvatac® RE 10, Sylvatac® RE 15, Sylvatac® RE 20, Sylvatac® RE 25 or Sylvatac® RE 40 by Arizona Chemical, USA.

Exemplary resins are, for example, Escorez™ 5040 (Exxon Mobil Chemical).

Picco A10 (Eastman Kodak) and Regalite R1010 (Eastman Kodak) are, for example, resins of other suitable hydrocarbon resins.

The proportion of all resins (H) can amount to between 5 and 30% by weight, for example, between 8 and 20% by weight, with respect to the hot melt adhesive composition.

The hot melt adhesive composition can also include at least one silane functional polyoxyalkylene prepolymer.

Such silane functional polyoxyalkylene prepolymers can be of the type that are suitable for application in polyurethane sealants that cure at room temperature.

The silane functional polyoxyalkylene prepolymer in an exemplary embodiment can be a silane functional polyurethane polymer (STP1), which can be obtained through the reaction of a silane, which features at least one isocyanate group reactive group that is vis-à-vis to a polyurethane polymer, which features isocyanate groups. The polyurethane polymer that features isocyanate groups is respectively obtainable from the reaction of at least one polyoxyalkylene polyol with at least one polyisocyanate, for example, as it has previously been described for the production of the reaction product (RP). Polyoxyalkylene polyols, which are also referred to as polyether polyols or oligoetherols, can be products of the polymerization of ethylene oxide, 1,2-propylene oxide, 1,2- or 2,3-butylene oxide, oxetane, tetrahydrofurane or mixtures thereof, which are polymerized with the help of a starter molecule having two or more active nitrogen atoms such as for example water, ammonia, or bonds with multiple OH— or NH groups such as for example 1,2-ethanediol, 1,2- and 1,3-propanediol, neopentyl glycol, diethylen glycol, triethylen glycol, the isomers dipropylen glycol and tripropylen glycol, the isomers butanediol, pentanediol, hexanediol, heptanediol, octanediol, nonanediol, decanediol, undecanediol, 1,3- and 1,4-cyclohexane dimethanol, bisphenol A, hydrated bisphenol A, 1,1,1-trimethylol ethane, 1,1,1-trimethylol propane, glycerin, aniline, as well as mixtures of the aforementioned compounds. Both polyoxyalkylene polyols, which feature a low level of unsaturation (measured according to ASTM D-2849-69 and expressed in milliequivalent level of unsaturation per gram of polyol (mEq/g)), which are for example produced with the help of so-called double metal cyanide complex catalysts (DMC catalysts), as well as also polyoxyalkylene polyol with a higher level of unsaturation, for example produced with the help of anionic catalysts such as NaOH, KOH, CsOH or alkali alcoholates, can be employed.

Exemplary are polyoxyalkylenediols or polyoxyalkylenetriols, for example, polyoxyethylene- and polyoxypropylenedi- and -triols. Exemplary are polyoxyalkylenediols and -triols having a level of unsaturation that is lower than 0.02 mEq/g and having a molecular weight in the range from 1,000 to 30,000 g/mol, as well as polyoxypropylenediols and -triols with a molecular weight of 400-8,000 g/mol.

In an exemplary embodiment, the silane functional polyoxyalkylene prepolymer can be a silane functional polyurethane polymer (STP2), which can be obtained through the reaction of an isocyanatosilane, with a polyoxyalkylene prepolymer, which in contrast to isocyanate groups feature reactive functional end groups, for example, hydroxyl groups, mercapto groups and/or amino groups. Exemplary is the polyoxyalkylene prepolymer of a polyoxyalkylene polyol, such as has been disclosed for the production of the aforementioned silane functional polyurethane polymer (STP1).

In an exemplary embodiment, the silane functional polyoxyalkylene prepolymer can be a silane functional polyoxyalylene prepolymer (STP3) which can be obtained through a hydrosilysation reaction of polyoxyalkylene prepolymer with terminal double bonds, for example, from allyl terminated polyoxyalkylene-polymers, which are, for example, described in U.S. Pat. No. 3,971,751 and U.S. Pat. No. 6,207,766, the disclosures of which are herein incorporated by reference. Suitable silane functional polymers (STP3) are for example commercially available under the trade names MS-Polymer®, for example, as MS-Polymer® S203H, S303H, S227, S810, MA903 and S943, Silyl® SAX220, SAX350, SAX400 and SAX725, Silyl® SAT350 and SAT400, as well as XMAP® SA100S and SA310S from the company Kaneka Corp., Japan, as well as under the trade names Excestar® S2410, S2420, S3430, S3630, W2450 and MSX931 from the company Asahi Glass Co, Ltd., Japan.

The amount of all of these silane functional polyoxyalkylene prepolymers can be under 50% by weight, for example, between 1 and 40% by weight, for example, between 5 and 30% by weight, based upon the weight of the hot melt adhesive composition.

The hot melt adhesive composition can additionally also include additional thermoplastic polymers. These can include, for example, thermoplastic polyester (TPE), thermoplastic polyurethane (TPU) as well as homo- or copolymers made up of at least one monomer, which is selected from ethylene, propylene, butylene, isobutylene, isoprene, vinyl acetate, vinyl ester of higher carboxylic acids and esters of (meth)acryl acids. Exemplary as such additional thermoplastics polymers are ethylene vinyl acetate copolymers (EVA). These thermoplastic polymers too can be grafted.

The hot melt adhesive composition can contain at least one catalyst, which catalyzes the reaction of isocyanate group and/or silane groups, for example, in an amount of 0.01 to 6.0% by weight, for example, between 0.01 and 5% by weight, for example, between 0.1 and 1.5% by weight, when related to the hot melt adhesive composition. Phosphoric acid ester or organic tin compounds, for example, are considered for such catalysts, for example, dibutyl tin dilaurate (DBTL).

Furthermore, the hot melt adhesive composition can include other components. For example, components such as plasticizers, adhesion promoters, UV absorption agents, UV and thermal stabilizers, optical brighteners, fungicides, pigments, dye stuffs, fillers and drying agents can be suitable as additional components.

In an exemplary embodiment, the hot melt adhesive composition can include:
a) 30-98% by weight, for example, 35-95% by weight, for example, 50-80% by weight, of the thermoplastic silane grafted poly-α-olefin (P) that is solid at 25° C.;
b) 3-50% by weight, for example, 4-10% by weight, of the reaction product (RP);
c) 0-60% by weight, for example, 1-30% by weight, of at least one filler;
d) 0-5% by weight, for example, 0.05-2% by weight, for example, 0.07-1% by weight, of at least one catalyst for the hydrolysis of the silane groups;
e) 0-30% by weight, for example, 5-30% by weight, for example, 8-20% by weight, of at least one resin (H).

Under the influence of water, for example, in the form of atmospheric humidity, the silane groups of the silane grafted poly-α-olefins (P) can hydrolyze to silanol groups (—SiOH), which react with one another and thereby while forming the siloxane groups (—Si—O—Si—) can lead to the curing of the hot melt adhesive composition. Such hot melt adhesive compositions can be designated as reactive hot melt adhesives.

Well dried raw materials can be used for the production of the hot melt adhesive compositions. The adhesives can be protected from contact with water or atmospheric humidity during production, storage and application.

The production can take place according to any suitable manner for hot melt adhesives.

The hot melt adhesive compositions can be liquefied through heating, in which the thermoplastic ingredients melt. The viscosity of the hot melt adhesive compositions can be adapted to the application temperature. The application temperature can be between 100 and 200° C. At such a temperature the adhesive can be readily workable. The viscosity can be 1,500-50,000 mPa·s in this temperature range. Were it to be substantially higher, then the application can become very difficult. Were it to be substantially lower, then upon application to the surfaces to be adhered, the adhesive can run before it is able to harden upon cooling.

The congealing and solidification of the adhesive that can accompany the cooling can bring about a rapid build-up of the strength and a high initial adhesive strength of the adhesive bond. The adhesion can take place within the timeframe in which the adhesive has not cooled down too severely. The adhesion can take place while the adhesive is still fluid, or alternatively while the adhesive is still tacky and malleable. In addition to this physical kind of hardening, the adhesive can also cure further after the cooling through the influence of water and, for example, of the atmospheric humidity. For example, within a short time, for example, a few hours or days, it can gain in mechanical strength. In an exemplary embodiment, in contrast to non-reactive hot melt adhesive compositions, the reactive hot melt adhesive compositions cannot be reheated and thereby newly liquefied. The use of such adhesives can be desirable for certain applications in which the composite elements which adhere to one another are exposed during their use or alternatively their lifespan to high temperatures, without there being any damage to the adhesion. The use of such hot melt adhesives can be desirable, for example, insofar as through the curing, such adhesives can show significantly less creepage.

An exemplary hot melt adhesive composition can have a longer pot life in thin layers. For example, a pot life can be many minutes long, for example, 3 to 10, during which it is possible to complete a joint with a joining element. During the pot life, it is possible for the adhesive to properly cure the surface of the joining element. Early strength can build itself up quickly, which can allow for the adhesive bond that has been created to be, within a short time, in the position to transfer forces to a certain extent. Thin layers in this document can include adhesive layers having a thickness of less than 1 mm, for example, between 0.05 and 0.5 mm, for example, about 0.1 mm. Through the water-dependent curing reaction, very high final strengths can be reached in the end, which can amount to between 1 and 2 MPa.

Exemplary hot melt adhesive compositions can be free of isocyanates and can be desirable in view of work hygiene and safety.

Exemplary hot melt adhesive compositions can have an extremely wide range of adhesion. For example, it is possible to glue a multitude of synthetic materials without primers, including non-polar synthetic materials such as polyethylene or polypropylene.

For example, due to the extended pot life, it is not necessary to "reactivate" (re-melt) the adhesive, as may be done when a comparative adhesive is used, before the joining with the surface of the joining element. This can lead to a highly simplified gluing process, which also obviously brings about a financial incentive to use adhesives.

An exemplary hot melt adhesive composition can be very stable in storage and have good workability characteristics, for example, in an application temperature range of 100 to 200° C. For example, at such temperatures, as regards viscosity, they can also be stable over long periods. The curing can occur quickly and in an odorless manner, and even in the case of thick coat applications, without blisters. The adhesive can have good adhesion and resistance against environmental influences.

The hot melt adhesive compositions can readily be used for the gluing of polyolefin films or foams or textiles.

In an exemplary application, the hot melt adhesive composition can be used as a laminating adhesive for the gluing of polyolefin films or foams or textiles.

The hot melt adhesive compositions can be well suited for the gluing of sandwich panels.

An exemplary hot melt adhesive composition adheres exceptionally well on a large number of distinct polar as well as nonpolar substrates. An exemplary hot melt adhesive composition can have an extended pot life in thin coats, but nonetheless can quickly build up a strong initial strength. An exemplary hot melt adhesive composition can maintain good adhesion, including in warm and moist storage for a longer time period. An exemplary hot melt adhesive composition can ensure exceptional adhesive bonds that are stable when exposed to heat because of the curing, and are thereby can be suitable for gluing, where the adhesive bond is exposed to higher temperatures. In an exemplary embodiment, even under such conditions, the bond can be maintained and there is, for example, either no or at most an extremely minimal creepage that has been determined, including when there is a longer continuous constant load and including at higher temperatures.

According to an exemplary aspect, disclosed is the use of the hot melt adhesive composition as an adhesive for assembly, laminating, textiles and furniture, or as an adhesive used for the construction of sandwich elements.

An exemplary hot melt adhesive composition can be suitable for use in applications in the automobile industry.

The hot melt adhesive composition can, for example, be used for the gluing of polyolefins and, for example, for the gluing of substrates, for example, of polyolefins, with polar substrates, for example, with polar synthetic materials or metals or glass.

Non-polar substrates can include, for example, plastics which are not polar plastics, such as for example polyolefins or polystyrenes. Exemplary non-polar plastics are polyolefins.

In an exemplary embodiment, polar plastics can be free of, for example, esters, acids, nitriles, aminos, alcohols, mercaptos, urethanes, ureas, amides, carbonates, sulfones, sulfonates, phosphones, phosphonates, ethers, aminos, epoxides, phenols and nitros. Wood, poly(methylmethacrylate) (PMMA), polycarbonate (PC), polyvinylchloride (PVC), acrylonitrile butadiene styrene copolymer (ABS) and polyamide (PA) can be suitable as polar substrates.

In an exemplary aspect, provided is a composite element, whose first substrate (S1), which for example is a polyolefin, features a hot melt adhesive composition (K), or alternatively a cured hot melt adhesive composition (K') which has been influenced by water, as well as a second substrate (S2), which for example is a polar plastic or metal or glass.

The hot melt adhesive composition, or alternatively the cured hot melt adhesive composition, can be located between the first substrate (S1) and the second substrate (S2). A polyolefin film can be employed as the first substrate (S1).

The "polyolefin film" can include a flexible flat polyolefin of a thickness of between 0.05 millimeter and 5 millimeter, which can be rolled up. The polyolefin film can have a thickness of less than 1 mm. The polyolefin film can include sealing membranes, which can be employed for the sealing of tunnels, roofs or swimming pools of a thickness that can be between 1 mm and 3 mm, and in some cases can have thicknesses of 5 mm. Such polyolefin films can be produced by means of painting, molding, calendaring or extrusion and are commercially available in rolls or are produced on site. They can be produced single-layered or multi-layered. Polyolefin films can also contain other additives and processing agents, such as fillers, UV- and thermal stabilizers, plasticizers, lubricants, biocides, flame protection agents, antioxidants, pigments such as for example titanium dioxide or carbon black, and coloring agents. This means that there are also such films, which are not made up of 100% polyolefins, which can also be identified as polyolefin films.

Figure 1:
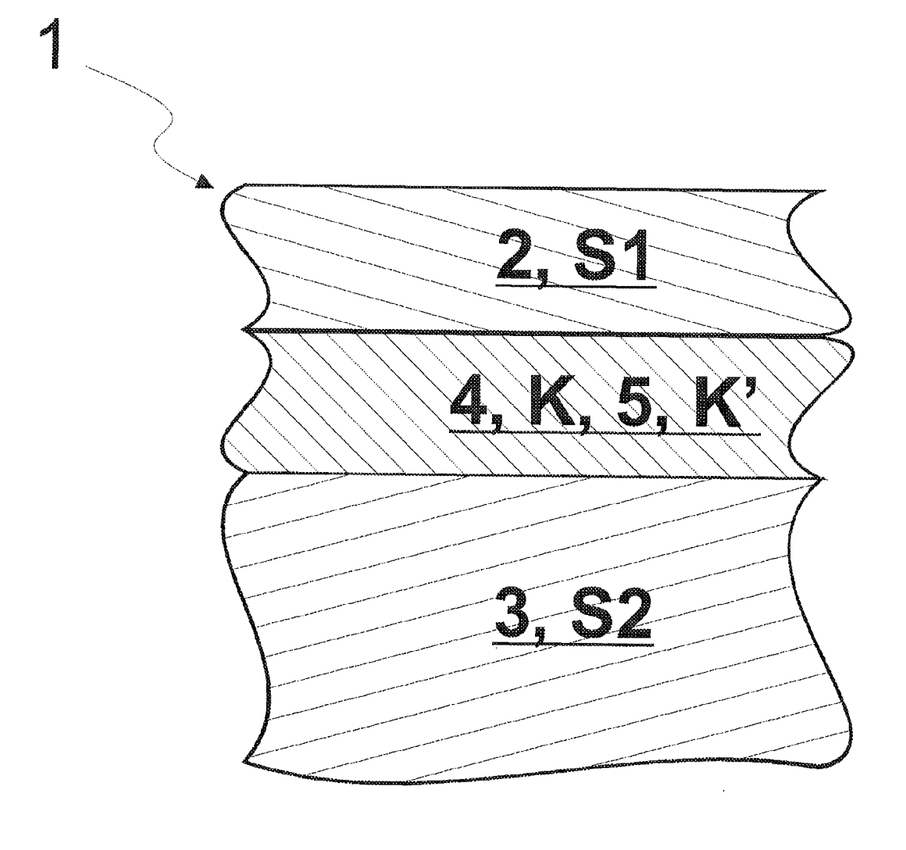
FIG. 1 is cross-sectional view of an exemplary composite element 1, which has a first substrate 2 (S1), a second substrate 3 (S2), and a hot melt adhesive composition 4 (K) and/or a hot melt adhesive composition 5 (K'), in accordance with an exemplary aspect.

FIG. 1 is a schematic representation of an exemplary composite element 1, which has a first substrate 2 (S1) and a second substrate 3 (S2) as well as a hot melt adhesive composition 4 (K), and/or alternatively a hot melt adhesive composition 5 (K') which has been cured through the influence of water, which is located between the first and second substrate and thereby adheres these two substrates to one another.

The second substrate (S2), which can also be identified as a carrier in lamination applications, can be of any suitable material. The substrates can for example be made of synthetic materials, for example, polyolefins or ABS, metal, painted metal, of plastic, wood, wood composites or fiber material. The substrate can be a solid formed body.

In an exemplary embodiment, the second substrate (S1) can be a poly-propylene.

The surface of the second substrate (S2) can be pre-treated. For example, such a pre-treatment can include a cleansing or the application of a primer. In an exemplary embodiment, no application of a primer is employed.

The described composite element can be an industrial production item, for example, an item for interior furnishing, for example, a component in a means of transportation or an item of the furniture trade.

It can be used in the production of interior lining components of vehicles, for example, of automobiles. Examples of such interior lining components are door panel pieces, switch panels, rear parcel shelves, head liners, sliding roofs, center consoles, glove compartments, sun visors, pillars, door pulls and arm rests, flooring, cargo flooring and trunk area groups as well as sleeping cabins and back walls of commercial and vehicles and trucks.

EXAMPLES

TABLE 1 raw materials and properties thereof

P1  Silane grafted poly-α-olefin,
    Molecular weight (Mn): 10,600 g/mol,
    Melt viscosity (190° C., DIN 53 019): 5,000 mPa · s,
    Softening temperature (ring & ball): 98° C.
P2  Silane grafted poly(propylene/ethylene) (poly-α-olefin) (achieved through metallocene catalysis)
    Melt viscosity (170° C. DIN 53 018): approximately 100 mPa · s,
    Softening temperature (ring &ball): 100° C.
    Dropping point: approximately 80° C.
    Density: approximately 0.90 g/cm$^3$
    Silane content: approximately 10% by weight (Grafting agent: vinyltriethoxysilane)

Production of the Reaction Product: RP-1

MDI (Desmodur 44 MC from Bayer) was presented in a large container under nitrogen and melted. Subsequently 3-mercaptopropyltrimethoxysilane (Fluka) in a ratio of 1.05 Mol mercapto groups to 1 Mol isocyanate groups was dripped in under agitation and was stirred until no isocyanate groups could be detected. This reaction mixture was subsequently cooled to room temperature under nitrogen and was used like this as reaction product RP-1 for the production of the compositions according to table 2.

Adhesive compositions were produced in which the ingredients were mixed with one another in an agitator according to the weight ratios given in table 2 at a temperature of 150° C. in an inert atmosphere.

Viscosity

Following the melting of the respective hot melt adhesive in a sealed tube for 20 minutes in a heating cabinet at a temperature of 140° C., 9.7 g of adhesive were weighed in a one-way sleeve and tempered for 20 minutes in a viscometer at the respective temperature that is given in table 2. The measurement of the viscosity then took place at 160° C. at 10 revolutions per minute on a Brookfield DV-2 Thermosel Viscometer with No. 27 spindle. The viscosity is given as the value at which it has arrived after 5 minutes of measurement. The measured value at 160° C. is given in table 2 as "Visc$_{160}$".

Pot Life

The hot melt adhesive was melted at 140° C., approximately 20 g was spread by means of a squeegee in strips of approximately 30 cm in a layer thickness of 500 μm and 60 mm width on the siliconized side of a siliconized sheet of paper (B700 white, Laufenberg & Sohn, Germany) that was placed on a hotplate at a temperature of 150° C. Immediately following the application of the adhesive, the thus coated paper was laid upon a beech wood plate that was conditioned at 23° C. At regular 30-second intervals ("$t_y$") one strip (10 cm×1 cm) of the Paper side of the siliconized paper was laid upon the adhesive, lightly pressed with the fingers and then slowly removed. The end of the pot life was determined as being the time (when compared to the time of application of the adhesive), at which the adhesive no longer adheres to the cover paper.

Adhesion

The adhesive compositions were melted at 140° C. and applied on the respective substrates as a bead of 5 mm height and cured for 7 days at 50% relative humidity and 23° C.

Then a spatula having a width of 10 cm was applied on the reverse side of the substrate in the fringe area of the cured adhesive and by means of manual force one attempted to push the spatula in this fringe area. In the case in which it was not possible to push the spatula into this fringe area, the adhesion was deemed to have "good adhesion". In the case in which it was possible to push the spatula in this fringe area and the adhesive ruptured or allowed itself to be removed by the fingers without much strain, the adhesion was then deemed to have "poor adhesion". If it was nonetheless possible to push the spatula into this area and however the adhesive only let itself be removed with the application of great force, for example, peeling off, the adhesion was then deemed to have "average adhesion".

The adhesion was correspondingly tested on polar and non-polar subsurfaces of polypropylene (PP), glass fiber reinforced plastic (GFRP), pine wood (wood), poly(methylmethacrylate) (PMMA), polycarbonate (PC), soft polyvinylchloride (PVC), acrylonitrile butadiene styrene copolymer (ABS) and polyamide (PA).

It is evident from the result of the table 2 that the examples/ through 5 demonstrate exceptionally good adhesion on various non-polar and polar subsurfaces, whereas this is not the case in the reference example Ref. 1, which did not feature any reaction product RP-1, for example, they did not demonstrate good adhesion on most of the polar subsurfaces.

TABLE 2

Hot melt adhesive compositions

| | 1 | 2 | 3 | 4 | 5 | Ref. 1 |
|---|---|---|---|---|---|---|
| P1 | 55 | 55 | 55 | 55 | 55 | 55 |
| Vestoplast ® 408[1] | 25 | 25 | 25 | 25 | 25 | 25 |
| P2 | 10 | 10 | 10 | 10 | 10 | 10 |
| Wingtack ® 86 (softening point: 86° C.) | 10 | 10 | 10 | 10 | 10 | 10 |
| Reaction product RP-1 | 0.5 | 1 | 3 | 10 | 25 | |
| Dibutyl tin dilaurate | 0.1 | 0.1 | 0.1 | 0.1 | 0.1 | 0.1 |
| Visc$_{160}$ [m · Pas] | 6100 | 5900 | 6000 | 6500 | 7500 | 6200 |
| Pot life [s] | 90 | 100 | 100 | 90 | 90 | 150 |
| Initial strength following 30 Min. [MPa] | 0.65 | 0.67 | 0.54 | 0.95 | 0.45 | 0.63 |

TABLE 2-continued

| | Hot melt adhesive compositions | | | | | |
|---|---|---|---|---|---|---|
| | 1 | 2 | 3 | 4 | 5 | Ref. 1 |
| Good adhesion on | PP, GFRP, Wood, PMMA PC, ABS, PA | PP, GFRP, Wood, PMMA PVC ABS, PA | PP, GFRP, Wood, PMMA PC, PVC, ABS, PA | PP, GFRP, Wood, PMMA PC, PVC, ABS, PA | PP, GFRP, Wood, PMMA PC, PVC ABS, PA | PP GFRP Wood |
| Average adhesion on | PVC | PC | | | | |
| Poor adhesion on | | | | | | Wood, PMMA PC, PVC ABS, PA |

[1]Vestoplast ® 408, available from Evonik, ungrafted poly-α-olefin

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A hot melt adhesive composition, comprising:
a) at least one thermoplastic silane grafted poly-α-olefin (P) that is solid at 25° C.; and
b) at least one reaction product (RP) of a polyisocyanate with an isocyanate reactive silane (S);
wherein the polyisocyanate is selected from the group consisting of 2,4- and 2,6-toluoylendiisocyanate (TDI), 4,4'-, 2,4'- and 2,2'-diphenylmethandiisocyanate, 1,3- and 1,4-phenylendiisocvanate, naphthaline-1,5-diisocyanate (NDI), 3,3'-dimethyl-4,4'-diisocyanatodiphenyl (TODI), 1,6-hexamethylendiisocyanate (HDI), 2-methylpentamethylene-1,5-diisocvanate, 2,2,4- and 2,4,4-trimethyl-1,6-hexamethylendiisocyanate (TMDI), 1,12-dodecamethylendiisocvanate, cyclohexane-1,3- and cyclohexane-1,4-diisocyanate, 1-isocyanato-3,3,5-trimethyl-5-isocyanatomethyl-cyclohexane (=isophorone diisocyanate or IPDI), perhydro-2,4'- and -4,4'-diphenylmethane diisocyanate (HMDI), 1,4-diisocyanato-2,2,6-trimethylcyclohexane (TMCDI), m- and p-xylylendiisocyanate (m- and p-XDI), m-tetramethyl-1,3- and m-tetramethyl-1,4-xylylene diisocyanate, p-tetramethyl-1,3- and m-tetramethyl-1,4-xylylene diisocyanate (m- and p-TMXDI), isocyanurates thereof, biurets thereof, and mixtures thereof,
wherein the isocyanate reactive silane (S) contains only one isocyanate reactive group, wherein the isocyanate reactive group is selected from the group consisting of a hydroxyl group, mercapto group and amino group, and
wherein the reaction product has a molecular weight $M_w$ of less than 1,500 g/mol.

2. The hot melt adhesive composition according to claim 1, wherein the silane grafted poly-α-olefin (P) has a softening temperature of between 60° C. and 160° C.

3. The hot melt adhesive composition according to claim 1, wherein the silane grafted poly-α-olefin (P) is a silane grafted copolymer or terpolymer formed from at least one monomer selected from the group consisting of ethylene, propylene, butylene and isobutylene.

4. The hot melt adhesive composition according to claim 1, wherein the silane grafted poly-α-olefin (P) is a silane grafted atactic poly-α-olefin (APAO).

5. The hot melt adhesive composition according to claim 1, wherein the poly-α-olefin (P) is produced through a grafting of silanes on a poly-α-olefin, which in turn is produced according to a Ziegler-Natta process.

6. The hot melt adhesive composition according to claim 1, wherein the hot melt adhesive composition contains at least two different silane grafted poly-α-olefins (P).

7. The hot melt adhesive composition according to claim 1, wherein the isocyanate reactive silane (S) is a compound of the formula (I):

(I)

wherein
$R^1$ stands for a linear or branched, optionally cyclical, alkylene group with between 1 and 20 C atoms, optionally with aromatic components;
$R^2$ stands for an alkyl group having between 1 and 5 C atoms,
$R^3$ stands for an alkyl group having between 1 and 8 C atoms,
a stands for 0, 1 or 2,
X stands for an isocyanate reactive group, which is selected from the group consisting of —OH, —SH, —NH$_2$ and —NHR$^4$,
wherein
$R^4$ stands for an alkyl remainder having between 1 and 12 C atoms or for a cycloaliphatic or aromatic remainder having between 6 and 12 C atoms or for a substituent of the formula (II):

(II)

8. The hot melt adhesive composition according to claim 1, wherein the polyisocyanate that is used for the production of the reaction product (RP) is selected from the group consisting of 4,4'-, 2,4'- and 2,2'-diphenylmethane diisocyanate (MDI), 2,4- and 2,6-toluoylene diisocyanate (TDI), 1,6-hexamethylene diisocyanate (HDI), 1-isocyanato-3,3,5-trimethyl-5-isocyanatomethyl-cyclohexane (=isophorone diisocyanate or IPDI), an isocyanurate selected from the group consisting of MDI, TDI, HDI and IPDI, a biuret selected from the group consisting of MDI, TDI, HDI and IPDI, and a combination thereof.

9. The hot melt adhesive composition according to claim 1, wherein the reaction product (RP) is a reaction product of 4,4'-, 2,4'- or 2,2'-diphenylmethane diisocyanate (MDI) with a 3-mercapto propyltrimethoxysilane, 3-mercapto propyltriethoxysilane or 3-mercapto propyl-dimethoxymethylsilane.

10. The hot melt adhesive composition according to claim 1, wherein the reaction product (RP) of a polyisocyanate with an isocyanate reactive silane (S), does not include any isocyanate groups.

11. The hot melt adhesive composition according to claim 1, wherein the hot melt adhesive composition contains at least one adhesion promoter of the formula (III):

(III)

wherein
R$^1$ stands for a linear or branched, optionally cyclical alkylene group having between 1 and 20 C atoms, optionally with aromatic components and/or heteroatoms;
R$^{2'}$ stands for an alkyl group having between 1 and 5 C atoms,
R$^{3'}$ stands for an alkyl group having between 1 and 8 C atoms, b stands for 0, 1 or 2;
X' is selected from the group consisting of —OH, —SH, —NH$_2$, —NHR$^{4'}$, glycidyloxy-, (meth)acryloxy-, acylthio- and vinyl groups;
wherein
R$^4$ stands for an alkyl remainder having between 1 and 12 C atoms or for a cycloaliphatic or aromatic remainder having between 6 and 12 C atoms or for a substituent of the formula (IV):

(IV)

12. The hot melt adhesive composition according to claim 1, wherein the hot melt adhesive composition contains at least one silane functional polyoxyalkylene prepolymer.

13. The hot melt adhesive composition according to claim 1, comprising:
a) 30-98% by weight of the thermoplastic silane grafted poly-α-olefin (P) that is solid at 25° C.;
b) 3-50% by weight of the reaction product (RP);
c) 0-60% by weight of at least one filler;
d) 0-5% by weight of at least one catalyst for the hydrolysis of the silane groups; and
e) 0-30% by weight of at least one resin (H),
based on a total weight of the hot melt adhesive composition.

14. The hot melt adhesive composition according to claim 1, wherein the hot melt adhesive composition is used as an assembly adhesive, a laminating adhesive, a textile adhesive, a furniture adhesive or as an adhesive for the building of sandwich elements.

15. A method of using a hot melt adhesive composition, the method comprising applying the hot melt adhesive composition according to claim 1 to a first substrate.

16. A composite element, comprising:
a) a first substrate (S1);
b) the hot melt adhesive composition according to claim 1, or the hot melt adhesive composition according to claim 1 that is cured through the influence of water; and
c) a second substrate (S2);
wherein the hot melt adhesive composition or the cured hot melt adhesive composition is located between the first substrate (S1) and the second substrate (S2).

17. The hot melt adhesive composition according to claim 1, wherein the silane grafted poly-α-olefin (P) has a softening temperature of between 80° C. and 140° C.

18. The hot melt adhesive composition according to claim 7, wherein:
R$^2$ stands for a methyl group, an ethyl group, or an acyl group,
R$^3$ stands for a methyl group, and
a stands for 0 or 1.

19. The hot melt adhesive composition according to claim 11, wherein:
R$^{1'}$ stands for a linear or branched, optionally cyclical alkylene group having between 1 and 20 C atoms, with at least one heteroatom that is an amine nitrogen atom,
R$^{2'}$ stands for a methyl group, an ethyl group, or an acyl group,
R$^{3'}$ stands for a methyl group, and
b stands for 0 or 1.

20. The hot melt adhesive composition according to claim 1, comprising:
a) 35-95% by weight of the thermoplastic silane grafted poly-α-olefin (P) that is solid at 25° C.;
b) 4-10% by weight of the reaction product (RP);
c) 1-30% by weight of at least one filler;
d) 0.05-2% by weight of at least one catalyst for the hydrolysis of the silane groups; and
e) 5-30% by weight of at least one resin (H),
based on a total weight of the hot melt adhesive composition.

21. The method according to claim 15, the method further comprising contacting the hot melt adhesive composition according to claim 1 with a second substrate,
wherein the first substrate is a polar substrate and the second substrate is a nonpolar substrate, or the first substrate is a nonpolar substrate and the second substrate is a polar substrate.

22. The composite element according to claim 16, wherein the first substrate is a polyolefin, and wherein the second substrate is a polar synthetic material or metal or glass.

* * * * *